(12) United States Patent
Affaki

(10) Patent No.: US 7,502,545 B2
(45) Date of Patent: Mar. 10, 2009

(54) PICTURE-IN-PICTURE WINDOW FOR VIDEO REPLAY

(75) Inventor: John Y. Affaki, San Jose, CA (US)

(73) Assignee: Microsoft Corporation, Redmond, WA (US)

( * ) Notice: Subject to any disclaimer, the term of this patent is extended or adjusted under 35 U.S.C. 154(b) by 747 days.

(21) Appl. No.: 11/116,475

(22) Filed: Apr. 28, 2005

(65) Prior Publication Data

US 2006/0245736 A1   Nov. 2, 2006

(51) Int. Cl.
*H04N 7/00* (2006.01)
*H04N 5/93* (2006.01)
(52) U.S. Cl. .......................................... 386/46; 386/52
(58) Field of Classification Search ............... 386/46, 386/52, 125, 124, 1
See application file for complete search history.

(56) References Cited

U.S. PATENT DOCUMENTS

| 5,621,473 | A  | * | 4/1997 | Hill ............................. 348/559 |
| 2002/0040475 | A1 | * | 4/2002 | Yap et al. ...................... 725/39 |
| 2005/0198677 | A1 | * | 9/2005 | Lewis .......................... 725/87 |

OTHER PUBLICATIONS

"Picture-in-picture", http://en.wikipedia.org/wiki/Picture-in-picture, printed Apr. 15, 2005, 1 page.
"TiVo User's Guide", 2004, 8 pages including pp. ii-vi.

* cited by examiner

*Primary Examiner*—Robert Chevalier
(74) *Attorney, Agent, or Firm*—Lee & Hayes, PLLC

(57) ABSTRACT

A picture-in-picture window is opened in response to a user-entered replay command received while displaying a live state of video content on a screen. At least a portion of the video content is replayed on one of the screen and the picture-in-picture window while continuing displaying of the live state of the video content in the other of the screen and the picture-in-picture window.

15 Claims, 4 Drawing Sheets

PICTURE-IN-PICTURE WINDOW FOR VIDEO REPLAY

TECHNICAL FIELD

This invention relates to playback of audio/video content, and particularly to a picture-in-picture window for video replay.

BACKGROUND

Digital video recorders (DVRs) have become very popular in recent years, increasingly replacing VCRs as the primary device for users to record all manner of television programs. In a DVR, programs are stored on a hard disk drive rather than on a VHS tape, which results in numerous benefits. Hard disk drives can typically store more programs than a VHS tape, can record one program while another previously recorded program is played back, can allow a user to begin watching a program that has already begun recording before the recording is completed, can oftentimes support better video and/or audio quality than a VHS tape, can allow indexing so that users can quickly see what programs are stored on the DVR and can quickly select programs for playback, can support random access to programs so that rewinding or fast forwarding to a particular portion of a tape is not required, and so on.

An additional advantage DVRs offer over VHS tape is the ability to replay a portion of a live program as it is being received. Some DVRs offer an "instant replay" feature that allows users to automatically replay a portion of the program that was just played. For example, a user watching a live football game that wants to watch a spectacular catch that was just made again can invoke the instant replay feature and have the previous ten seconds of the football game re-played, allowing him or her to re-watch that catch. After the ten-second replay has completed, the DVR returns to displaying the live program as it is received.

Although such replay functionality is very useful, it is not without its problems. One such problem is that, while the user is replaying a portion of the program, he or she is missing the other portions of the live program being received. For example, if the user invokes the instant replay feature and re-watches ten seconds of a football game, after replaying those ten seconds the DVR returns to displaying the live football game. Thus, the user has missed viewing the ten seconds of the football game that immediately succeeded the invoking of the instant replay feature.

One solution to this problem is for the DVR to simply continue playing the program but with a ten-second lag. In other words, after completing the ten-second replay, the DVR would not jump ahead to the current live position of the program, but instead would continue to display the program ten seconds behind the current live position of the program. Although this solution enables the user to avoid missing any of the program, it has its own problems because the user is no longer watching the program live. Every time the user invokes the instant replay option he or she gets another ten seconds behind the current live position of the program, which is an unacceptable situation for many users.

Thus, it would be beneficial to have an improved way of handling instant replay functionality.

SUMMARY

A picture-in-picture window for video replay is described herein.

In accordance with certain aspects, a picture-in-picture window is opened in response to a user-entered replay command received while displaying a live state of video content on a screen. At least a portion of the video content is replayed on one of the screen and the picture-in-picture window while continuing displaying of the live state of the video content in the other of the screen and the picture-in-picture window.

BRIEF DESCRIPTION OF THE DRAWINGS

The same numbers are used throughout the document to reference like components and/or features.

DETAILED DESCRIPTION

A picture-in-picture window for video replay is described herein. While audio/video content is being presented to a user on a screen, the user can enter a replay command, such as by pressing an instant replay button. In response to the replay command, a picture-in-picture window is automatically created. One of the screen and the picture-in-picture window continues to display the live state of the video content, while the other of the screen and the picture-in-picture window displays the replay functionality. The audio content can be designated to track the video in the picture-in-picture window or the screen. This use of the picture-in-picture window allows the user to view an instant replay of the content while at the same time view the live state of the video content.

Figure 1:
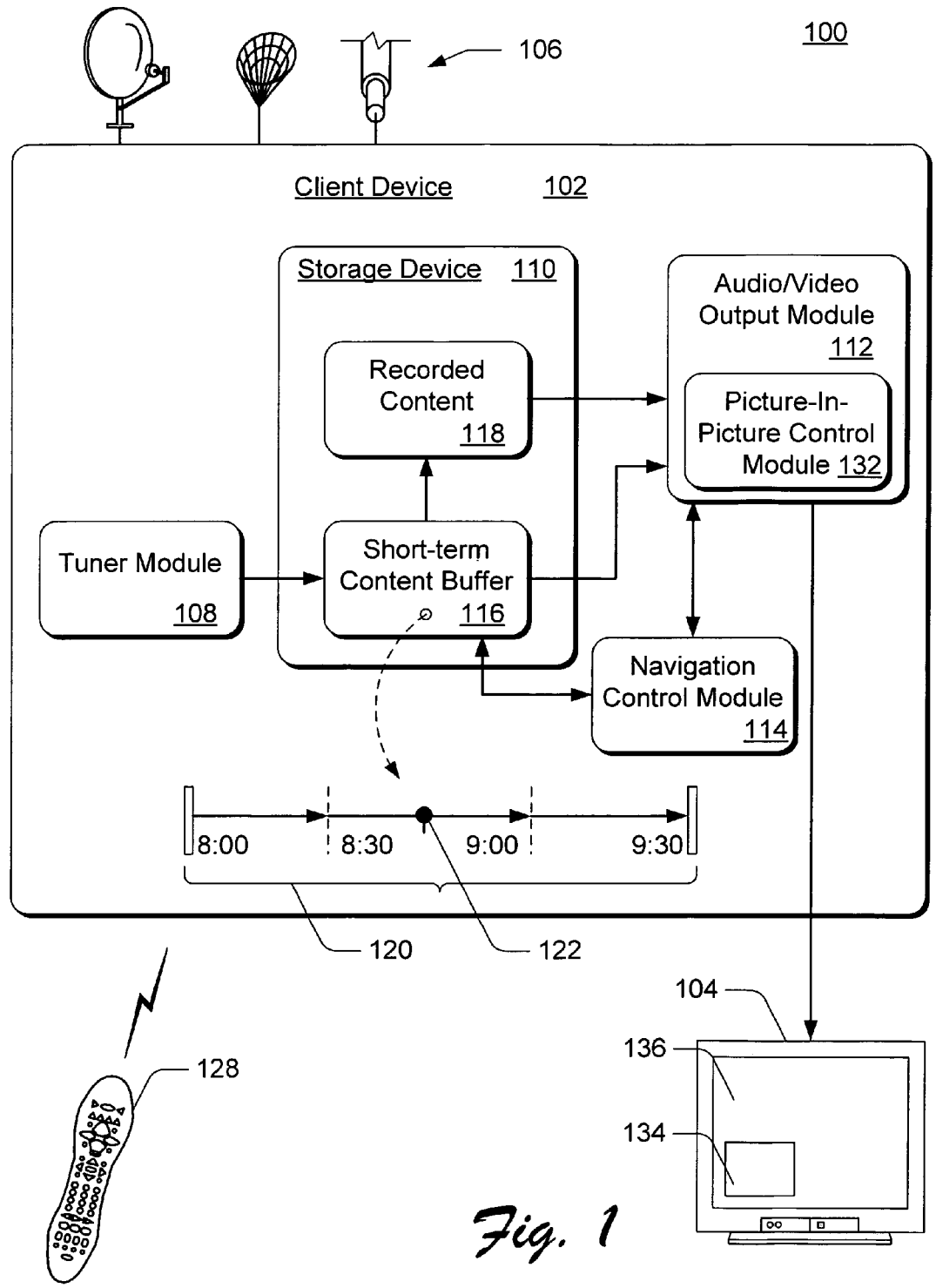
FIG. 1 illustrates an example video playback system.

FIG. 1 illustrates an example video playback system 100 which includes a client device 102 and a display device 104. Client device 102 receives audio/video content via one or more of various transmission media 106, such as satellite transmission, radio frequency transmission, cable transmission, and/or via any number of other transmission media, such as via a broadband network or via the Internet. Client device 102 can be any of a variety of different devices, such as a set-top box, a digital video recorder (DVR) and playback system, a personal video recorder (PVR) and playback system, an appliance device, a desktop or portable computer, a video game system, or any other type of device that may be implemented in a video playback-based system.

The audio/video content received by client device 102 is typically a program or portion of a program. Programs refer to all types of television programming content that can be communicated to client device 102. Programs include all varieties of shows, movies, sporting events, and so forth. Programs include both content for which no fee is charged to the user of client device 102, as well as content for which a fee is (or may be) charged to the user of client device 102.

Client device 102 includes a tuner module 108, a storage device 110, an audio/video output module 112, and a navigation control module 114. Tuner module 108, audio/video output module 112, and navigation control module 114 can be implemented in software, firmware, hardware, or combinations thereof. A user can input commands to client device 102 using any of a variety of input devices, such as remote control 128. Alternatively, other input devices may be used, such as a PDA (personal digital assistant), cellular phone, another device employing infrared (IR), 802.11, Bluetooth, or similar RF input device, a keypad or other device connected by wire to client device 102, and so forth. Alternatively, a user may be able to input commands to client device 102 via an interface that is part of client device 102, such as a keypad, touch screen, or other input device.

Tuner module 108 receives signals via one or more of transmission media 106 and obtains from these signals audio/video content. Typically, each transmission media 106 will have multiple channels that tuner module 108 can tune to in order to obtain the audio/video content being transmitted on that channel. The exact manner in which tuner module 108 obtains the audio/video content can vary, depending on the nature of transmission media 106. For example, tuner module 108 may tune to a particular frequency, may receive network data packets communicated to a particular address (such as an Internet Protocol (IP) address), and so forth. A single tuner module 108 may be able to obtain audio and/or video content from multiple different transmission media 106, or alternatively a separate tuner module 108 may be included for each type of transmission media 106 via which client device 102 is intended to support receiving of audio and/or video content. Typically, a single tuner module 108 can receive both audio and video content, although alternatively a particular tuner module 108 may be configured to receive only audio content or only video content.

Tuner module 108 forwards the received audio and video content to storage device 110. Alternatively, tuner module 108 may also forward the received audio and video content to audio/video output module 112.

Storage device 110 stores audio and video content received from tuner module 108. Storage device 110 can be implemented using one or more of any of a variety of storage components, such as solid state memory, magnetic disk, optical disk, and so forth. Oftentimes, storage device 110 is implemented using a magnetic hard disk drive.

Storage device 110 includes a short-term content buffer 116 and recorded content 118. Recorded content 118 is content that has been received by client device 102 and stored for later viewing. For example, a user may request that a program that is broadcast in the afternoon be recorded so that he or she may watch it later that evening or a few days later.

Short-term content buffer 116, on the other hand, is short-term storage of the most recently received audio/video content, which allows a user to replay or otherwise navigate (e.g., fast forward or rewind) through recently received audio/video content. Audio/video content received by tuner module 108 is routed to short-term content buffer 116 which maintains segments of the content, such as the most recent sixty minutes, for example. The amount of content maintained in buffer 116 can vary, depending on the size of buffer 116 and the quality of the audio/video content being stored (higher quality content typically requires more storage space than lower quality content).

A time duration 120 illustrates that a particular program is an hour and a half long, from a start time of 8:00 to an end time of 9:30. The example illustrates that a first segment of the movie from the start time of 8:00 to 8:30 has been routed through short-term content buffer 116 while a next segment of the movie from 8:30 to 9:00 is maintained in short-term content buffer 116. A next segment of the movie from 9:00 until the end of the movie at 9:30 is yet to be received and routed through short-term content buffer 116. If a user chooses to record a program that is being received, short-term content buffer also saves the received content as recorded content 118.

The received audio/video content is routed as one or more streams from short-term content buffer 116 to audio/video output module 112. Audio/video output module 112 communicates the audio and/or video content to display device 104 where the content is presented to the user. Audio/video output module 112 communicates the video content to display device 104 for viewing by the user. If display device 104 includes audio playback capability (e.g., speakers), then audio/video output module 112 also communicates the audio content to display device 104 for playback. Alternatively, the audio content can be communicated to another device (not shown) for playback.

The video content that is output by audio/video output module 112 for display to the user has associated with it a live state. The live state of the video content refers to the particular video content that is being displayed on display device 104 as it is received by tuner module 108. While a particular program is being played to the user of system 100, a stream of video content is being continually received by tuner module 108 and communicated to display device 104, so the live state of the content is continually changing. However, if a user pauses the playback of the content, then the live state of the content is no longer being displayed (but is being maintained in short-term content buffer 116 for playback when the user turns off the pause). It should be noted that there is typically at least a small delay between receipt of the video content by tuner module 108 and display of that content by display device 104 due to processing performed by client device 102.

Navigation control module 114 allows a user to navigate through recently received audio/video content while still continuing to record in buffer 116 the audio/video content as it is received by tuner module 108. For example, a user may input an "instant replay" command to client device 102, requesting that a certain portion (e.g., the last ten seconds) of the just-displayed content be replayed. The user may also input other commands to navigate through the recently received audio/video content, such as rewinding through the content, pausing playback, fast forwarding through the content (e.g., after rewinding or pausing playback), and so forth. Such commands are received by navigation control module 114, which communicates with short-term content buffer 116 to forward the appropriate content, based on the received commands, to audio/video output module 112.

A user can enter commands to navigate through recently received audio/video content using an input device, such as remote control 128. In certain embodiments, remote control 128 includes separate buttons associated with each of an instant replay command, a rewind command, a fast forward command, a pause command, and so on. User selection of one of these buttons (e.g., by pressing the button) results in the associated command being communicated from remote control 128 to client device 102. For example, if the user presses an instant replay button on remote control 128, an instant replay command is communicated from remote control 128 to client device 102.

Figure 2:
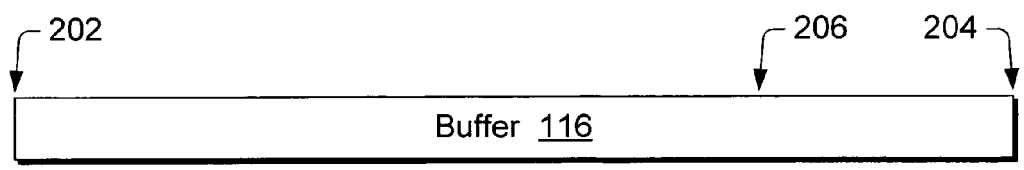
FIG. 2 illustrates an example of a short-term content buffer.

FIG. 2 illustrates an example of short-term content buffer 116. Initially, content is written into short-term content buffer 116 at a beginning location 202. As content is received, it fills buffer 116 until the end location 204 of buffer 116 is reached. The writing of data to buffer 116 may return to beginning location 202 when client device 102 is turned on, each time the user changes the channel, and so forth. When end location 204 is reached, subsequent content is written starting again at beginning location 202, overwriting the content that was previously written at beginning location 202. Short-term content buffer 116 can thus be viewed as a circular buffer, continually keeping the most recent content received at client device 102.

A current location marker 206 is also maintained for short-term content buffer 116. Current location marker 206 identifies the location in buffer 116 where the next content to be received will be written (or alternatively, where the most recently received content has been written), and is continually updated as new data is added to buffer 116. Current location marker 206 corresponds to the live state of the video content being stored in buffer 116. Current location marker 206 can be, for example, a pointer to a location in buffer 116 or another data structure that references to a position in buffer 116 but is maintained separately from buffer 116. Alternatively, current location marker 206 can be created as an indication point within the content in buffer 116, or as any number and type of indicators or identifiers, such as flags, data bits, and the like.

When a replay command is received by client device 102, the location of current location marker 206 is noted. This allows navigation control module 114 to know what content was most recently presented to the user when the replay command was received. This notation or record of the location of current location marker 206 is used, for example, to know when the replaying of the content has caught up to the content that was most recently presented to the user when the replay command was received (e.g., when the content being replayed is the same content as the live state of the video content when the replay command was received).

Returning to FIG. 1, audio/video control module 112 includes a picture-in-picture control module 132. When a replay command is received by client device 102, picture-in-picture control module 132 automatically creates a picture-in-picture window 134 on screen 136 of display device 104. Screen 136 is the screen where the audio/video content was being displayed when the replay command is received. Screen 136 is typically referred to as the "full screen"—the full display area of display device 104. Alternatively, screen 136 could be another window being displayed on display device 104. When created, picture-in-picture window 134 is situated "on top" of screen 136, allowing different video content to be displayed on window 134 than is displayed on the portions of screen 136 that are not covered by window 134.

Although picture-in-picture window 134 is illustrated in FIG. 1 in the lower left corner of screen 136, the location of picture-in-picture window 134 can vary. Picture-in-picture window 134 can be located anywhere on screen 136. Additionally, the size of picture-in-picture window 134 can vary. The location and size of picture-in-picture window 134 can be a user-configurable option. For example, a menu or other user interface can be displayed to the user allowing him or her to select the size and/or location of picture-in-picture window 134 using an input device, such as remote control 128. By way of another example, an input device, such as remote control 128, may include one or more buttons configured to send a command to picture-in-picture control module 132 to alter the size and/or location of picture-in-picture window 134 when pressed by the user.

The replay functionality is displayed on one of picture-in-picture window 134 and screen 136, and the live state of the content is displayed on the other of picture-in-picture window 134 and screen 136. The content displayed on picture-in-picture window 134 covers the content displayed on screen 136, so some portions of the content displayed on screen 136 will not be visible to the user (that is, those portions that are covered by picture-in-picture window 134).

For example, assume that a movie is being received by tuner module 108 and being displayed on screen 136, and that an instant replay command is entered by the user at a time of 1:05:34 (1 hour, 5 minutes, 34 seconds) into the movie. The time of 1:05:34 into the movie is noted and navigation control module 114 creates picture-in-picture window 134. Further assume that the instant replay command causes the last ten seconds of the content to be re-played. The video content of the movie starting at 1:05:24 into the movie will be played back on screen 136, while the live state of the video content of the movie continues to be played back on picture-in-picture window 134. Thus, the video content being played back on screen 136 is starting at 1:05:24 into the movie, while the video content being played back on picture-in-picture window 134 is proceeding from time 1:05:35. Ten seconds later, when playback time of the audio/video content on screen 136 reaches the noted time of 1:05:34 into the movie, the replay is completed and picture-in-picture window 134 is closed. The live state of the content on screen 136 will have also advanced ten seconds, and thus will continue to be displayed on screen 136 from 1:05:44 into the movie.

Whether the picture-in-picture window is automatically created and the replay functionality displayed in one of the picture-in-picture window and the screen in response to a replay command can also be a user-configurable feature that the user can enable and disable. For example, a menu or other user interface can be displayed to the user allowing him or her to select what actions should be taken in response to a replay command using an input device, such as remote control 128. The different actions could be, for example, automatically creating the picture-in-picture window and displaying the replay functionality on one of the picture-in-picture window and the screen, and not opening a picture-in-picture window but displaying the replay functionality on the screen.

Figure 3:
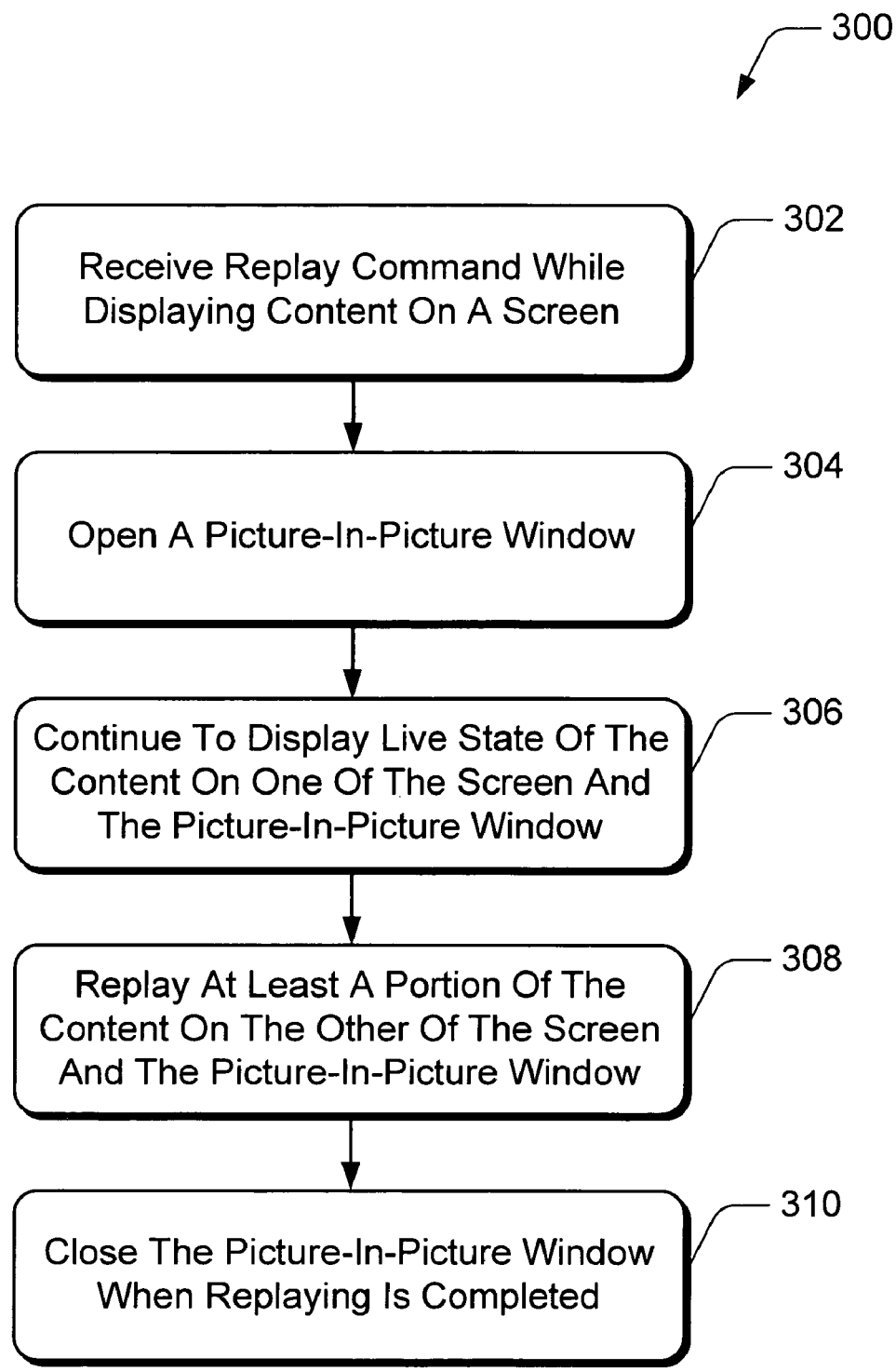
FIG. 3 illustrates an example method for implementing the picture-in-picture window for video replay.

FIG. 3 illustrates an example method 300 for implementing the picture-in-picture window for video replay discussed herein. The order in which the method is described is not intended to be construed as a limitation, and any number of the described method acts can be combined in any order to implement the method. Furthermore, the method can be implemented in any suitable hardware, software, firmware, or combination thereof. FIG. 3 is discussed with reference to components of system 100 of FIG. 1 as examples.

Initially, a replay command is received while content is displayed on a screen (act 302). This replay command can be, as discussed above, a command associated with pressing an instant replay button on a remote control, a command associated with pressing a rewind button on a remote control, and so forth. In response to the receipt of the replay command, a picture-in-picture window is automatically created or opened (act 304). This picture-in-picture window is a picture-in-picture window within the screen on which the content is being displayed. The display of the live state of the content is continued on one of the screen and the picture-in-picture window (act 306), while at least a portion of the content is replayed on the other of the screen and the picture-in-picture window (act 308).

When the replaying of the content is completed (regardless of whether the replaying content is being displayed on the screen or the picture-in-picture window), the picture-in-picture window is closed (act 310). Completion of the replaying can be determined in different manners. In the case of the instant replay command, the replaying is completed when the playback time of the replay content reaches the noted time as discussed above. In such cases, the picture-in-picture window can be automatically closed when the playback time of the replay content reaches the noted time as discussed above. Completion of the replaying can also be determined in other manners, such as when the user presses a button associated with a stop command, when the user re-presses the button associated with the instant replay command, when the user presses a close window button associated with a close picture-in-picture window, and so forth.

In the case of the rewind button, a notation of when the rewind button was pressed may be made so that the replaying can be completed when the playback time of the replay content reaches the noted time, analogous to the instant replay command scenario discussed above. Completion of the replaying can also be determined in other manners, such as when the user presses a button associated with a stop command, when the user re-presses the button associated with the rewind command, when the playback time of the replay content reaches the live state of the content, when the user presses a close window button associated with a close picture-in-picture window, and so forth.

The amount of the content (the size of the portion) that is replayed in act 308 can vary. Different client devices can be configured with different values, and the user may optionally be able to configure this value. For example, a menu or other user interface can be displayed to the user allowing him or her to enter this value (e.g., in seconds) using an input device, such as remote control 128. Additionally, in certain embodiments there may be multiple instant replay commands, each associated with a different value. For example, remote control 128 may have a 10-second instant replay button and a 20-second instant replay button. When the 10-second instant replay button is pressed, 10 seconds of the content is replayed. When the 20-second instant replay button is pressed, 20 seconds of the content is replayed.

As discussed above, two different streams of video content (the replay content and the live state of the content) are displayed on the screen and the picture-in-picture window in acts 306 and 308, typically only one stream of audio content is played back to the user. This audio stream can track or be synchronized with the video being displayed on the screen, or alternatively with the video being displayed on the picture-in-picture window. Navigation control module 114 is configured with an indication of which video the audio stream should track or be synchronized with, and communicates with short-term content buffer 116 to have the proper audio content communicated to audio/video output module 112. Which of the screen and the picture-in-picture window the audio tracks can optionally be user-configurable. For example, a menu or other user interface can be displayed to the user allowing him or her to enter which of the screen and the picture-in-picture window is to be tracked by the audio stream. Such user-selection can be made using an input device, such as remote control 128.

Alternatively, two different audio streams may be played back to the user, one tracking or synchronized with the video content displayed on the screen and the other tracking or synchronized with the video content displayed on the picture-in-picture window. The same audio playback component may playback both audio streams concurrently, or alternatively each of two different audio playback components may play back a different audio stream. For example, one speaker may play back the audio stream tracking or synchronized with the video content displayed on the screen, while the other speaker plays back the audio stream tracking or synchronized with the video content displayed on the picture-in-picture window. The two different audio streams can be played back at the same volume level, or alternatively two different volume levels. Whether one audio stream is played back or two audio streams are played back can also optionally be a user-configurable feature. For example, a menu or other user interface can be displayed to the user allowing him or her to choose whether one audio stream is played back or two audio streams are played back using an input device, such as remote control 128.

Additionally, it should be noted that the replay command need not be an instant replay command. The replay command can be another content navigation command, such as a rewind command.

Thus, it can be seen that the picture-in-picture window for video replay is automatically created in response to the replay command being received at the client device. Thus, in response to the user pressing a single button on a remote control device (e.g., an instant replay button), the picture-in-picture window is automatically created, and the user is able to view both the replayed portion of the video content and the live state of the content concurrently.

Figure 4:
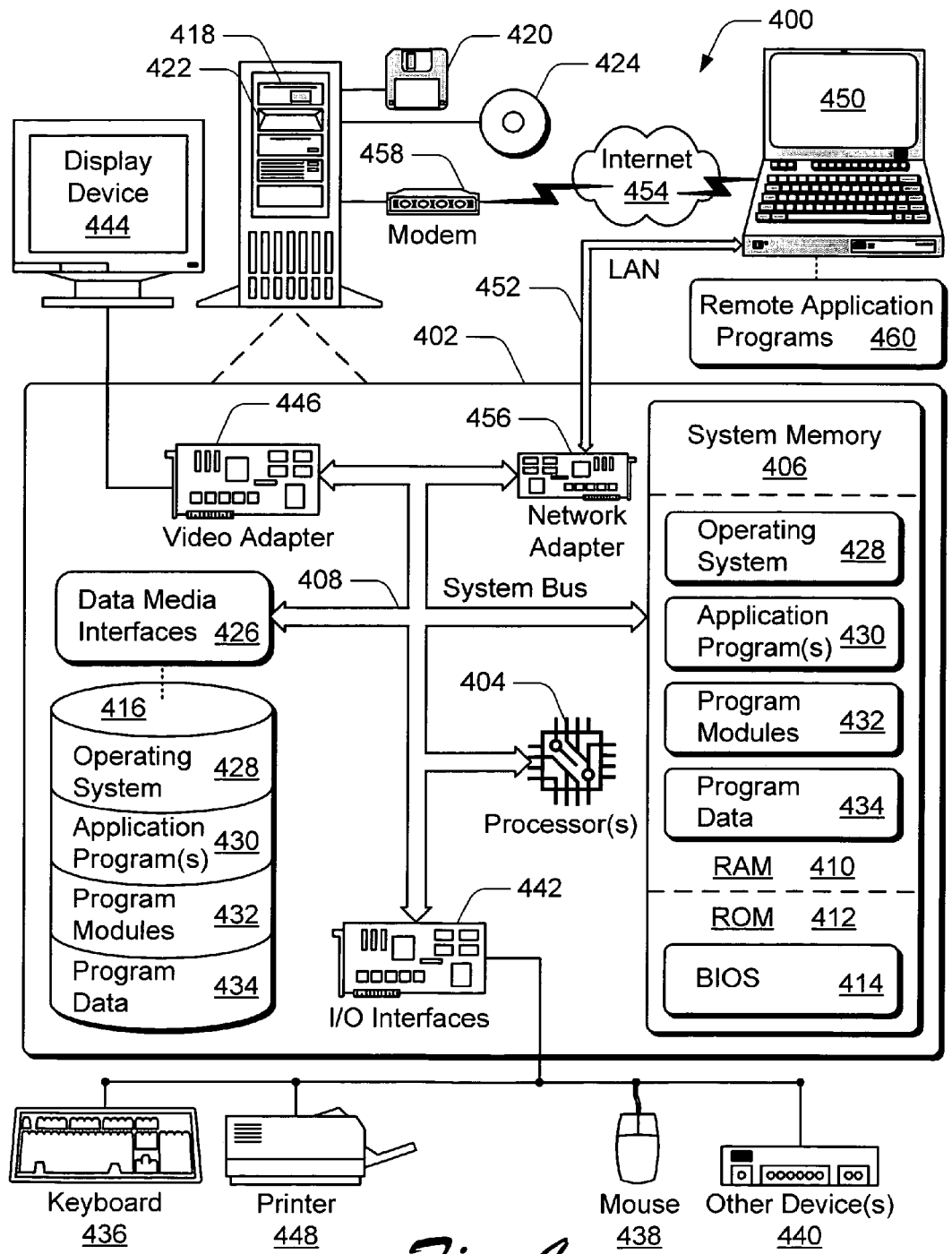
FIG. 4 illustrates an example computing environment within which the picture-in-picture window for video replay can be fully or partially implemented.

FIG. 4 illustrates an example computing environment 400 within which the picture-in-picture window for video replay described herein can be fully or partially implemented. Computing environment 400 is only one example of a computing system and is not intended to suggest any limitation as to the scope of use or functionality of the architectures. Neither should the computing environment 400 be interpreted as having any dependency or requirement relating to any one or combination of components illustrated in the exemplary computing environment 400.

The computer and network architectures in computing environment 400 can be implemented with numerous other general purpose or special purpose computing system environments or configurations. Examples of well known computing systems, environments, and/or configurations that may be suitable for use include, but are not limited to, personal computers, server computers, client devices, hand-held or laptop devices, microprocessor-based systems, multiprocessor systems, set top boxes, programmable consumer electronics, network PCs, minicomputers, mainframe computers, gaming consoles, distributed computing environments that include any of the above systems or devices, and the like.

The computing environment 400 includes a general-purpose computing system in the form of a computing device 402. Computing device 402 can be, for example, a client device 102 of FIG. 1. The components of computing device 402 can include, but are not limited to, one or more processors 404 (e.g., any of microprocessors, controllers, security processors or co-processors, and the like), a system memory 406, and a system bus 408 that couples the various system components. The one or more processors 404 process various computer executable instructions to control the operation of computing device 402 and to communicate with other electronic and computing devices. The system bus 408 represents any number of several types of bus structures, including a memory bus or memory controller, a peripheral bus, an accelerated graphics port, and a processor or local bus using any of a variety of bus architectures.

Computing environment 400 includes a variety of computer readable media which can be any media that is accessible by computing device 402 and includes volatile and non-volatile media, and removable and non-removable media. The system memory 406 includes computer readable media in the form of volatile memory, such as random access memory (RAM) 410, and/or non-volatile memory, such as read only memory (ROM) 412. A basic input/output system (BIOS) 414 maintains the basic routines that facilitate information transfer between components within computing device 402, such as during start-up, and is stored in ROM 412. RAM 410 typically contains data and/or program modules that are immediately accessible to and/or presently operated on by one or more of the processors 404.

Computing device 402 may include other removable/non-removable, volatile/non-volatile computer storage media. By way of example, a hard disk drive 416 reads from and writes to a non-removable, non-volatile magnetic media (not shown), a magnetic disk drive 418 reads from and writes to a removable, non-volatile magnetic disk 420 (e.g., a "floppy disk"), and an optical disk drive 422 reads from and/or writes to a removable, non-volatile optical disk 424 such as a CD-ROM, digital versatile disk (DVD), or any other type of optical media. In this example, the hard disk drive 416, magnetic disk drive 418, and optical disk drive 422 are each connected to the system bus 408 by one or more data media interfaces 426. The disk drives and associated computer readable media provide non-volatile storage of computer readable instructions, data structures, program modules, and other data for computing device 402.

Any number of program modules can be stored on RAM 410, ROM 412, hard disk 416, magnetic disk 420, and/or optical disk 424, including by way of example, an operating system 428, one or more application programs 430, other program modules 432, and program data 434. Each of such operating system 428, application program(s) 430, other program modules 432, program data 434, or any combination thereof, may include one or more embodiments of the systems and methods described herein.

A user can interface with computing device 402 via any number of different input devices such as a keyboard 436 and pointing device 438 (e.g., a "mouse"). Other input devices 440 (not shown specifically) may include a microphone, joystick, game pad, controller, satellite dish, modem (e.g., allowing coupling to a conventional telephone line, a DSL connection, cable, and/or other type of connection), serial port, scanner, remote control, PDA (personal digital assistant), cellular phone, and/or the like. These and other input devices are connected to the processors 404 via input/output interfaces 442 that are coupled to the system bus 408, but may be connected by other interface and bus structures, such as a parallel port, a game port, a universal serial bus (USB), an infrared (IR) port, an 802.11 port, a Bluetooth port, and so on.

A display device 444 (or other type of monitor) can be connected to the system bus 408 via an interface, such as a video adapter 446. In addition to the display device 444, other output peripheral devices can include components such as speakers (not shown) and a printer 448 which can be connected to computing device 402 via the input/output interfaces 442.

Computing device 402 can operate in a networked environment using logical connections to one or more remote computers, such as remote computing device 450. By way of example, remote computing device 450 can be a personal computer, portable computer, a server, a router, a network computer, a peer device or other common network node, and the like. The remote computing device 450 is illustrated as a portable computer that can include any number and combination of the different components, elements, and features described herein relative to computing device 402.

Logical connections between computing device 402 and the remote computing device 450 are depicted as a local area network (LAN) 452 and a general wide area network (WAN) 454. Such networking environments are commonplace in offices, enterprise-wide computer networks, intranets, and the Internet. When implemented in a LAN networking environment, the computing device 402 is connected to a local network 452 via a network interface or adapter 456. When implemented in a WAN networking environment, the computing device 402 typically includes a modem 458 or other means for establishing communications over the wide area network 454. The modem 458 can be internal or external to computing device 402, and can be connected to the system bus 408 via the input/output interfaces 442 or other appropriate mechanisms. The illustrated network connections are merely exemplary and other means of establishing communication link(s) between the computing devices 402 and 450 can be utilized.

In a networked environment, such as that illustrated with computing environment 400, program modules depicted relative to the computing device 402, or portions thereof, may be stored in a remote memory storage device. By way of example, remote application programs 460 are maintained with a memory device of remote computing device 450. For purposes of illustration, application programs and other executable program components, such as operating system 428, are illustrated herein as discrete blocks, although it is recognized that such programs and components reside at various times in different storage components of the computing device 402, and are executed by the one or more processors 404 of the computing device 402.

Various modules and techniques described herein can be implemented using computer-executable instructions, such as program modules, executed by one or more computers or other devices. Generally, program modules include routines, programs, objects, components, data structures, etc. that perform particular tasks or implement particular abstract data types. Typically, the functionality of the program modules may be combined or distributed as desired in various embodiments.

An implementation of these modules and techniques may be stored on or transmitted across some form of computer readable media. Computer readable media can be any available media that can be accessed by a computer, such as computing device 402 of FIG. 4. By way of example, and not limitation, computer readable media may comprise "computer storage media" and "communications media."

"Computer storage media" includes volatile and non-volatile, removable and non-removable media implemented in any method or technology for storage of information such as computer readable instructions, data structures, program modules, or other data. Computer storage media includes, but is not limited to, RAM, ROM, EEPROM, flash memory or other memory technology, CD-ROM, digital versatile disks (DVD) or other optical storage, magnetic cassettes, magnetic tape, magnetic disk storage or other magnetic storage devices, or any other medium which can be used to store the desired information and which can be accessed by a computer.

"Communication media" typically embodies computer readable instructions, data structures, program modules, or other data in a modulated data signal, such as carrier wave or other transport mechanism. Communication media also includes any information delivery media. The term "modulated data signal" means a signal that has one or more of its characteristics set or changed in such a manner as to encode information in the signal. By way of example, and not limitation, communication media includes wired media such as a wired network or direct-wired connection, and wireless media such as acoustic, RF, infrared, and other wireless media. Combinations of any of the above are also included within the scope of computer readable media.

Although the description above uses language that is specific to structural features and/or methodological acts, it is to be understood that the subject of the appended claims is not limited to the specific features or acts described. Rather, the specific features and acts are disclosed as example forms of implementing the invention.

What is claimed is:

1. A method comprising:
   opening, in response to a user-entered replay command received while displaying a live state of video content on a screen, a picture-in-picture window;
   replaying at least a portion of the video content on one of the screen and the picture-in-picture window while continuing displaying the live state of the video content in the other of the screen and the picture-in-picture window;
   automatically closing the picture-in-picture window when replaying of the at least a portion of the video content is completed, wherein automatically closing the picture-in-picture window comprises:
   identifying a time associated with the video content when the user-entered replay command is received;
   monitoring a playback time associated with the at least a portion of the video content being replayed; and
   automatically closing the picture-in-picture window when the time and the playback time are the same time.

2. A method as recited in claim 1, wherein the replay command is entered by user selection of an instant replay button on a remote control.

3. A method as recited in claim 1, wherein the replay command is entered by user selection of a rewind button on a remote control.

4. A method as recited in claim 1, further comprising:
   allowing a user to select whether audio is played back, in response to the user-entered replay command, tracking the video content displayed on the screen or the video content displayed on the picture-in-picture window.

5. A method as recited in claim 1, wherein the portion of the video content that is replayed is user-configurable.

6. A method as recited in claim 1, further comprising:
   performing the opening and replaying only if a user has enabled picture-in-picture replay functionality; and
   if the user has not enabled the picture-in-picture replay functionality, then replaying, in response to the user-entered replay command, the at least a portion of the video content on the screen without opening the picture-in-picture window.

7. One or more computer readable media having a plurality of instructions that, when executed by one or more processors of a device, causes the one or more processors to:
   display on a screen, video content;
   receive, while the video content is being displayed, a user-entered replay command;
   create a picture-in-picture window on the screen;
   continue display of the video content on one of the screen and the picture-in-picture window;
   re-display some of the video content on the other of the screen and the picture-in-picture window;
   automatically close the picture-in-picture window when the re-display of some of the video content is completed, wherein to automatically close the picture-in-picture window is to:
   identify a time associated with the video content when the user-entered replay command is received;
   monitor a playback time associated with the video content being re-displayed; and
   automatically close the picture-in-picture window when the time and the playback time are the same time.

8. One or more computer readable media as recited in claim 7, wherein the amount of the video content that is re-displayed is a user-configurable number of seconds of the video content.

9. One or more computer readable media as recited in claim 7, wherein the replay command is entered by user selection of an instant replay button on a remote control.

10. One or more computer readable media as recited in claim 7, wherein the replay command is entered by user selection of a rewind button on a remote control.

11. One or more computer readable media as recited in claim 7, wherein the plurality of instructions further cause the one or more processors to:
    allow a user to select whether audio is played back, in response to the user-entered replay command, synchronized with the video content displayed on the screen or the video content displayed on the picture-in-picture window.

12. A system comprising:
    a picture-in-picture control module to open, in response to a user-entered replay command received while an audio/video output module is communicating a live state of video content to a display device, a picture-in-picture window; and
    a navigation control module, coupled to the picture-in-picture control module, to control replaying of at least a portion of the video content on one of a screen of the display device and a picture-in-picture window of the display device while the live state of the video content continues to be displayed on the other of the screen of the display device and the picture-in-picture window of the display device,
    wherein the picture-in-picture control module is further configured to automatically close the picture-in-picture window when replaying of the at least a portion of the video content is completed, wherein, when automatically closing the picture-in-picture window the picture-in-picture control module is further configured to:
    identify a time associated with the video content when the user-entered replay command is received;
    monitor a playback time associated with the at least a portion of the video content being replayed; and
    automatically close the picture-in-picture window when the time and the playback time are the same time.

13. A system as recited in claim 12, wherein the replay command is entered by user selection of an instant replay button on a remote control.

14. A system as recited in claim 12, wherein the replay command is entered by user selection of a rewind button on a remote control.

15. A system as recited in claim 12, wherein the navigation control module is further configured to:
    allow a user to select whether audio is played back, in response to the user-entered replay command, tracking the video content displayed on the screen or the video content displayed on the picture-in-picture window.

* * * * *

UNITED STATES PATENT AND TRADEMARK OFFICE
CERTIFICATE OF CORRECTION

PATENT NO. : 7,502,545 B2
APPLICATION NO. : 11/116475
DATED : March 10, 2009
INVENTOR(S) : John Y. Affaki It is certified that error appears in the above-identified patent and that said Letters Patent is hereby corrected as shown below:

In the Claims:

In column 11, line 45, in Claim 7, after "display" insert -- , --.

Signed and Sealed this
Nineteenth Day of April, 2011

David J. Kappos
*Director of the United States Patent and Trademark Office*